US012756465B2

(12) United States Patent
Ko et al.

(10) Patent No.: US 12,756,465 B2
(45) Date of Patent: Oct. 6, 2026

(54) METHOD AND DEVICE FOR OPTIMIZING BEAM-POINTING IN WIRELESS OPTICAL COMMUNICATION SYSTEM

(71) Applicant: KOREA UNIVERSITY RESEARCH AND BUSINESS FOUNDATION, Seoul (KR)

(72) Inventors: Young Chai Ko, Seoul (KR); Hong Seol Cha, Seoul (KR); Byung Ju Lim, Seoul (KR); Jong Min Kim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 233 days.

(21) Appl. No.: 18/720,732

(22) PCT Filed: Dec. 13, 2022

(86) PCT No.: PCT/KR2022/020196
§ 371 (c)(1),
(2) Date: Jun. 17, 2024

(87) PCT Pub. No.: WO2023/113419
PCT Pub. Date: Jun. 22, 2023

(65) Prior Publication Data

US 2025/0070872 A1 Feb. 27, 2025

(30) Foreign Application Priority Data

Dec. 15, 2021 (KR) ........................ 10-2021-0179775
Aug. 24, 2022 (KR) ........................ 10-2022-0106405

(51) Int. Cl.
*H04B 10/112* (2013.01)
*H04B 10/079* (2013.01)

(52) U.S. Cl.
CPC ..... *H04B 10/112* (2013.01); *H04B 10/07953* (2013.01); *H04B 10/07955* (2013.01)

(58) Field of Classification Search
CPC ............ H04B 10/112; H04B 10/07953; H04B 10/07955; H04B 10/079; H04B 10/564;
(Continued)

(56) References Cited

U.S. PATENT DOCUMENTS

2002/0054411 A1* 5/2002 Heminger .............. G02B 6/359 398/118
2010/0158536 A1 6/2010 Vaillon et al.
(Continued)

FOREIGN PATENT DOCUMENTS

JP 2000244408 A * 9/2000 ........... H04B 10/105
JP 2017-188887 A 10/2017
(Continued)

OTHER PUBLICATIONS

International Search Report issued on Mar. 31, 2023 for corresponding International Patent Application No. PCT/KR2022/020196, along with an English translation (5 pages).
(Continued)

*Primary Examiner* — Hibret A Woldekidan
(74) *Attorney, Agent, or Firm* — Hauptman Ham, LLP

(57) ABSTRACT

An embodiment of the present disclosure relates to a method for optimizing beam-pointing in a wireless optical communication system may comprise receiving, from an optical reception device by an optical transmission device, information related to power of a light, which is transmitted from
(Continued)

a specific transmission terminal among one or more transmission terminals of the optical transmission device and is received by one or more reception terminals of the optical reception device on the basis of coordinate values associated with the one or more reception terminals; determining, by the optical transmission device, coordinate values which maximize a signal-to-noise ratio on the basis of the determined power of the received light; and transmitting a beam from the specific transmission terminal toward the optical reception device by the optical transmission device on the basis of the determined coordinate values.

10 Claims, 7 Drawing Sheets

(58) Field of Classification Search
CPC .... H04B 10/40; H04B 10/0795; H04B 10/11; H04B 10/114; H04B 10/1123; H04B 10/1121; H04B 10/1129; H04B 10/116
See application file for complete search history.

(56) References Cited

U.S. PATENT DOCUMENTS

2017/0288772 A1* 10/2017 Li .................... H04B 10/07953
2021/0250092 A1 8/2021 Dickson

FOREIGN PATENT DOCUMENTS

KR 10-1508873 B1 4/2015
KR 10-1922038 B1 2/2019

OTHER PUBLICATIONS

Written Opinion issued on Mar. 31, 2023 for corresponding International Patent Application No. PCT/KR2022/020196 (4 pages).
Office Action issued on Nov. 23, 2023 for corresponding Korean Patent Application No. 10-2022-0106405, along with an English machine translation (8 pages).
Notice of Allowance issued on Mar. 20, 2024 for corresponding Korean Patent Application No. 10-2022-0106405, along with an English machine translation (3 pages).

* cited by examiner

METHOD AND DEVICE FOR OPTIMIZING BEAM-POINTING IN WIRELESS OPTICAL COMMUNICATION SYSTEM

CROSS REFERENCE TO RELATED APPLICATION

This application is a National Stage No. of International Application PCT/KR2022/020196, filed on Dec. 13, 2022, which claims the benefit of earlier filing date and right of priority to Korean Application No. 10-2021-0179775, filed on Dec. 15, 2021, and Korean Application No. 10-2022-0106405, filed on Aug. 24, 2022, the contents of which are all hereby incorporated by reference herein in their entirety.

TECHNICAL FIELD

The present disclosure relates to wireless optical communication, and specifically relates to a method and a device for optimizing beam-pointing in a wireless optical communications system.

BACKGROUND ART

Recently, as the wireless communication technology has developed rapidly and mobile data has increased rapidly, RF spectrum resources have been exhausted, including utilizing a millimeter band in radio frequency (RF)-based mobile communication, etc. The wireless optical communication technology using an optical spectrum band is being researched to supplement or replace a RF spectrum.

As free space optical (FSO) communication is an example of the wireless optical communication technology, it may utilize all infrared light, visible light and ultraviolet light regions through an optical system such as a lens as a communication medium in a medium such as the atmosphere, water, vacuum or space, not a solid medium such as an optical fiber, etc. In addition, unlike the existing RF communication, the wireless optical communication technology such as FSO does not have a problem in the right (or the license) to use a frequency, and it is a technology that guarantees high-speed communication speed, safety and security which are the advantages of optical communication. If wireless optical communication is used in long-distance non-terrestrial communication, a high signal-to-noise ratio (SNR) may be obtained even with low transmission power.

Research on a multi-lens-based wireless optical communication system is being conducted to further improve transmission speed. Unlike a RF-based communication system, a signal does not spread and propagate in a wireless optical communication system such as FSO, so a direction in which a transmission signal beam is transmitted (i.e., beam-pointing) has a significant impact on performance.

In particular, when the number of transmission terminals (e.g., a lens included in an optical system of a transmission terminal) and the number of reception terminals (e.g., a lens included in an optical system of a reception terminal) are not the same, system performance depends on reception terminal(s) for which beam-pointing from a specific transmission terminal heads. Accordingly, a method for optimizing beam-pointing from a transmission terminal is required, but no specific method has yet been prepared to solve this problem.

DISCLOSURE

Technical Problem

A technical problem of the present disclosure is to provide a method and a device for optimizing a beam direction from a transmission terminal to maximize a signal-to-noise ratio at a reception terminal.

An additional technical problem of the present disclosure is to provide a method and a device for optimizing a beam direction from one transmission terminal to at least one reception terminal.

The technical objects to be achieved by the present disclosure are not limited to the above-described technical objects, and other technical objects which are not described herein will be clearly understood by those skilled in the pertinent art from the following description.

Technical Solution

A method for optimizing beam-pointing in a wireless optical communication system according to an aspect of the present disclosure may include receiving, from the optical reception device by the optical transmission device, information related to power of received light in the at least one reception terminal based on a coordinate value associated with at least one reception terminal of an optical reception device from a specific transmission terminal among at least one transmission terminal of an optical transmission device; determining, by the optical transmission device, a coordinate value which maximizes a signal-to-noise ratio based on the determined power of received light; and transmitting, toward the optical reception device, a beam from the specific transmission terminal by the optical transmission device based on the determined coordinate value. Here, a transmission terminal may correspond to a transmission lens and a reception terminal may correspond to a reception lens.

In an optical transmission device for optimizing beam-pointing in a wireless optical communication system according to an additional aspect of the present disclosure, the device includes a processor; a light source; an optical system; and a memory, and the processor may be configured to receive, from the optical reception device by an optical transmission device, information related to power of received light in the at least one reception terminal based on a coordinate value associated with at least one reception terminal of an optical reception device from a specific transmission terminal among at least one transmission terminal of the optical transmission device; determine, by the optical transmission device, a coordinate value which maximizes a signal-to-noise ratio based on the determined power of received light; and transmit, toward the optical reception device, a beam from the specific transmission terminal of the optical transmission device based on the determined coordinate value.

The characteristics which are simply summarized above for the present disclosure are just an illustrative aspect of a detailed description of the after-described present disclosure and do not limit a scope of the present disclosure.

Advantageous Effects

According to the present disclosure, a method and a device for optimizing a beam direction from a transmission terminal to maximize a signal-to-noise ratio at a reception terminal may be provided.

According to the present disclosure, a method and a device for optimizing a beam direction from one transmission terminal to at least one reception terminal may be provided.

Effects achievable by the present disclosure are not limited to the above-described effects, and other effects which are not described herein may be clearly understood by those skilled in the pertinent art from the following description.

BEST MODE

Figure 1:
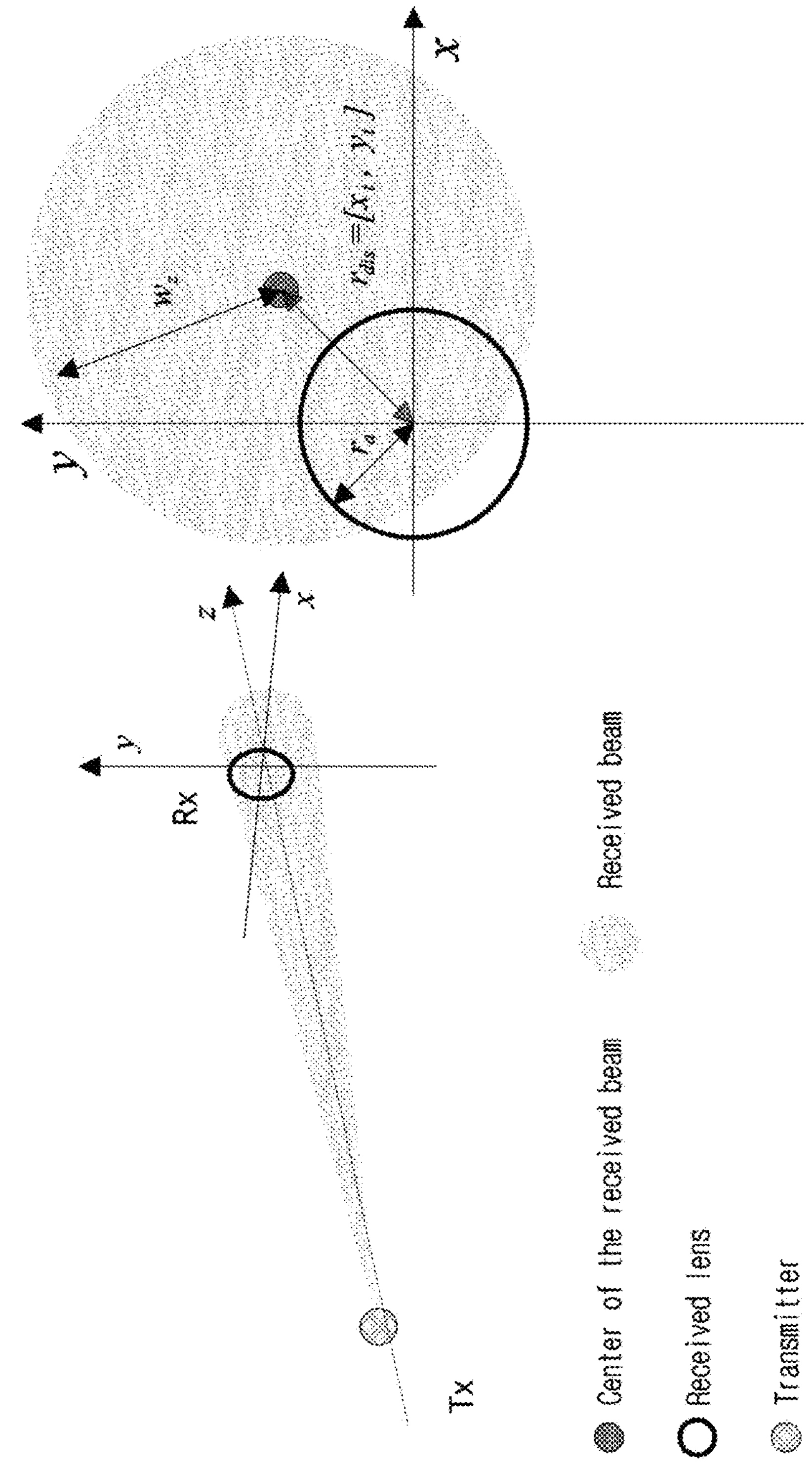
FIG. 1 is a diagram for describing a transmission and reception environment between a single transmission terminal and a single reception terminal in a wireless optical communication system to which the present disclosure may be applied.

Hereinafter, an embodiment of the present disclosure will be described in detail so that those skilled in the pertinent art from the following description can easily carry it out by referring to an attached diagram. However, the present disclosure may be implemented in a variety of different forms and is not limited to an embodiment which is described herein.

In describing an embodiment of the present disclosure, when it is determined that a detailed description on a disclosure configuration or function could cloud a gist of the present disclosure, a detailed description thereon is omitted. In addition, a part irrelevant to a description on the present disclosure in a diagram is omitted and a similar diagram code is attached to a similar part.

In the present disclosure, when an element is referred to as being “connected”, “combined” or “linked” to another element, it may include an indirect connection relation that yet another element presents therebetween as well as a direct connection relation. In addition, when an element is referred to as “including” or “having” another element, it means that another element may be additionally included without excluding another element unless otherwise specified.

In the present disclosure, a term such as first, second, etc. is used only to distinguish one element from other element and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

In the present disclosure, elements which are distinguished each other are to clearly describe each characteristic and do not mean that elements must be separated. In other words, a plurality of elements may be combined and configured in a unit of one hardware or software and one element may be distributed and configured in a unit of a plurality of hardware or software. Accordingly, even if separately mentioned, such a combined or distributed embodiment is also included in a scope of the present disclosure.

In the present disclosure, elements described in a variety of embodiments do not necessarily mean essential elements and some may be a selective element. Accordingly, an embodiment configured with a subset of elements described in an embodiment is also included in a scope of the present disclosure. In addition, an embodiment which additionally includes other element in elements described in a variety of embodiments is also included in a scope of the present disclosure.

The present disclosure is about a communication between network nodes in a wireless optical communication system. A network node may include at least one of a base station, a terminal or a relay. A wireless optical communication system may support communication in a structure such as a base station and a terminal, support direct communication between devices, and support communication via a relay in communication between a base station and a terminal or communication between devices.

The present disclosure describes a multi-lens based free space optical (multi-lens based FSO) communication system as an example of a wireless optical communication system by providing a representative example. In the following description, a transmission terminal may be mutually replaced with a transmission lens, and a reception terminal may be mutually replaced with a reception lens. However, a wireless optical communication system to which the present disclosure may be applied is not limited to this example, and it may also be applied when an optical system of a transmission terminal and a reception terminal is configured in various ways, such as a laser, a reflector, etc.

Below, embodiments of the present disclosure for beam-pointing optimization in a multi-lens based FSO system are described.

If a multi-lens based wireless optical communication system consists of N transmission lenses and N reception lenses, a beam direction may be determined by matching a transmission lens and a reception lens one-to-one. In other words, if it is assumed that a line of sight (LOS) on an optical transmission medium is maintained, optimization of a beam direction is not difficult when the number of transmission terminals is the same as the number of reception terminals. However, even if a LOS is maintained, when the number of transmission terminals is different from the number of reception terminals, especially when the number of transmission terminals is less than the number of reception terminals, the whole system performance may vary depending on a position on a plane where at least one reception terminal is arranged, for which a beam direction of a specific (or each) transmission terminal among at least one transmission terminal heads.

Due to a characteristic of light spreading in a long-distance communication situation using wireless optical communication, performance of one-to-one communication between a transmission terminal and a reception terminal in a multi-lens-based system may deteriorate by interference caused by beam divergence. When a diversity technique is used to prevent interference caused by beam divergence, interference may be transformed into reception power, so in a wireless optical communication system, spatial diversity is preferred over spatial multiplexing in a long-distance communication situation. A method for determining a position of a reception terminal to which a beam should be transmitted to maximize diversity performance is described below.

According to the present disclosure, a beam direction from a specific single transmission terminal among at least one transmission terminal of an optical transmission device to a multi-reception terminal of an optical reception device may be optimized. For example, an optical transmission device may receive real-time feedback from an optical reception device about a coordinate of a multi-reception terminal randomly arranged in an optical reception device and each channel experienced by a beam transmitted from a specific single transmission terminal. Based on feedback information, an optical transmission device may predict or determine a beam alignment direction of a specific transmission terminal that maximizes a signal-to-noise ratio (SNR).

A representative example of the present disclosure as above may be expanded not only to a single transmission terminal, but also to a multi-transmission terminal. In other words, an optimal beam direction for each of a plurality of transmission terminals of an optical transmission device may be determined according to the example. Accordingly, examples of the present disclosure may be applied to a multi-lens-based wireless optical communication system. Accordingly, it is possible to predict or determine beam-pointing of a transmitter that maximizes a SNR of a multi-lens system in a long-distance communication situation using wireless optical communication.

Furthermore, even when the number of transmission terminals is greater than the number of reception terminals, examples of the present disclosure may be applied in determining a beam direction of each transmission terminal for deriving optimal diversity performance from a plurality of transmission terminals.

Hereinafter, specific examples of the present disclosure are described.

An electromagnetic wave transmitted from a transmission terminal of a wireless optical communication-based system is mainly in an infrared wavelength band of 1550 nm. In this wavelength band, an electromagnetic wave exhibits a property of light due to its short wavelength. The power of a beam transmitted from a transmission terminal to a z-axis has a two-dimensional Gaussian distribution on a x-axis and a y-axis.

FIG. 1 is a diagram for describing a transmission and reception environment between a single transmission terminal and a single reception terminal in a wireless optical communication system to which the present disclosure may be applied.

In a situation where one transmission terminal and one reception terminal exist as one pair as in FIG. 1, power (i.e., Y) obtained from each reception terminal corresponds to power of light of a part where a transmitted two-dimensional Gaussian beam overlaps with an area of a reception lens, and may be shown as in Equation 1.

$$Y = \int_{A_r} I_r(r, z) r dr d\theta + n \quad \text{[Equation 1]}$$

In Equation 1, $I_r(r,z)$ is a probability distribution function for power at a (r,z) coordinate of a transmission beam. $A_r$ refers to an area where a reception lens exists, and n refers to AWGN. The total power of received beams is calculated by integrating a power density function of light within an area reaching a reception lens on a cylindrical coordinate system.

If it is assumed that transmission beam power has a two-dimensional Gaussian distribution and undergoes attenuation while being transmitted to a reception terminal through a channel, $I_r(r,z)$ may be expressed as in Equation 2.

$$I_r(r, z) = h_l \times h_a \times I_t(r, z) \quad \text{[Equation 2]}$$

In Equation 2, $h_1$ represents power attenuation (pathloss) according to a distance, and may be expressed as $h_1=\exp(-\sigma z)$. Here, σ corresponds to an attenuation coefficient. Next, $h_a$ represents power attenuation according to a medium characteristic (e.g., atmospheric turbulence).

Meanwhile, power distribution $I_t(r,z)$ of a two-dimensional Gaussian beam may be expressed as in Equation 3.

$$I_t(r, z) = \frac{2}{\pi w_z} \exp\left(-\frac{2(x^2 + y^2)}{w_z^2}\right) \quad \text{[Equation 3]}$$

For r=[x,y] in Equation 3, a density distribution function of power of light may be known at a position of z, and $w_z$, a size of a beam at z, may be expressed as in Equation 4.

For r=[x,y] in Equation 3, a density distribution function of power of light may be known at a position of z, and $w_z$, a size of a beam at z, may be expressed as in Equation 4.

$$w_z = w_0\left(1 + \epsilon\left(\frac{\lambda z}{\pi w_0^2}\right)^2\right)^{1/2} \quad \text{[Equation 4]}$$

In Equation 4, $w_0$ refers to a beam size at z=0, and λ represents a wavelength of a beam. ε may be expressed as in Equation 5.

$$\epsilon = \left(1 + \frac{2w_0^2}{\rho_0^2(z)}\right) \quad \text{[Equation 5]}$$

In Equation 5, $\rho^2{}_0(z)$ may be expressed as in Equation 6.

$$\rho_0^2(z) = \left(0.55\ C_n^2 k^2 z\right)^{-3/5} \quad \text{[Equation 6]}$$

In Equation 6, k represents the number of light waves, and $C^2{}_n$ represents a refractive structure parameter. Through Equation 1 to Equation 6, power of light obtained from reception terminal may be derived.

In Equation 1, $h_1$ and $h_a$ are a constant obtained between a transmission terminal and a reception terminal, so Equation 1 may be modified like Equation 7.

$$Y = h_l \times h_a \times \int_{-r_a}^{r_a} \int_{-\sqrt{r_a^2 - y^2}}^{\sqrt{r_a^2 - y^2}} \frac{2}{\pi w_z} \exp\left(-\frac{2(x^2 + y^2)}{w_z^2}\right) dx dy + n \quad \text{[Equation 7]}$$

In Equation 7, $r_a$ corresponds to a length of a radius of a reception terminal lens. In Equation 7, the remaining sections other than $h_1$ and $h_a$ may be defined as $h_p(r_{dis},z)$. In other words, $h_p(r_{dis},z)$ may correspond to power of a beam received by a reception lens when a distance between the center of a reception beam and the center of a reception lens is defined as $r_{dis}=(x_t, y_t)$. $h_p(r_{dis},z)$ in Equation 7 may be expressed as in Equation 8.

$$h_p(r_{dis}, z) = \int_{-r_a}^{r_a}\int_{-\sqrt{r_a^2-y^2}}^{\sqrt{r_a^2-y^2}} \frac{2}{\pi w_z}\exp\left(-\frac{2(x^2+y^2)}{w_z^2}\right)dxdy \quad \text{[Equation 8]}$$

In Equation 8, if a beam size ($w_z$) at a position of z exceeds a predetermined reference value, Equation 8 may be approximated. For example, for $w_z>6r_a$, Equation 8 may be approximated as in Equation 9.

$$h_p(r_{dis}, z) \simeq A_0\exp\left(-\frac{2(x_t^2+y_t^2)}{w_{zeq}^2}\right) \quad \text{[Equation 9]}$$

In Equation 9, it means $$A_0 = (\mathrm{erf}(v))^2,\ v = \frac{\sqrt{\pi}\,r_a}{\sqrt{2}\,w_z},$$

$$w_{zeq}^2 = w_z^2\frac{\sqrt{\pi}\,\mathrm{erf}(v)}{2v\exp(-v^2)} \text{ and}$$

$$\mathrm{erf}(z) = \frac{2}{\sqrt{\pi}}\int_0^z e^{-x^2}.$$

In Equation 9, $r_{dis}=(x_t, y_t)$ refers to a center point of a beam received when the center of a reception terminal lens is (0,0) (or, a distance between a center point of a reception beam and a center point of each reception terminal lens). As in an example described above, power of light (i.e., Y) obtained by one reception terminal from a beam from one transmission terminal may be defined, and hereinafter, examples of the present disclosure for determining a beam direction from one transmission terminal to at least one or a plurality of reception terminals are described.

Figure 2:
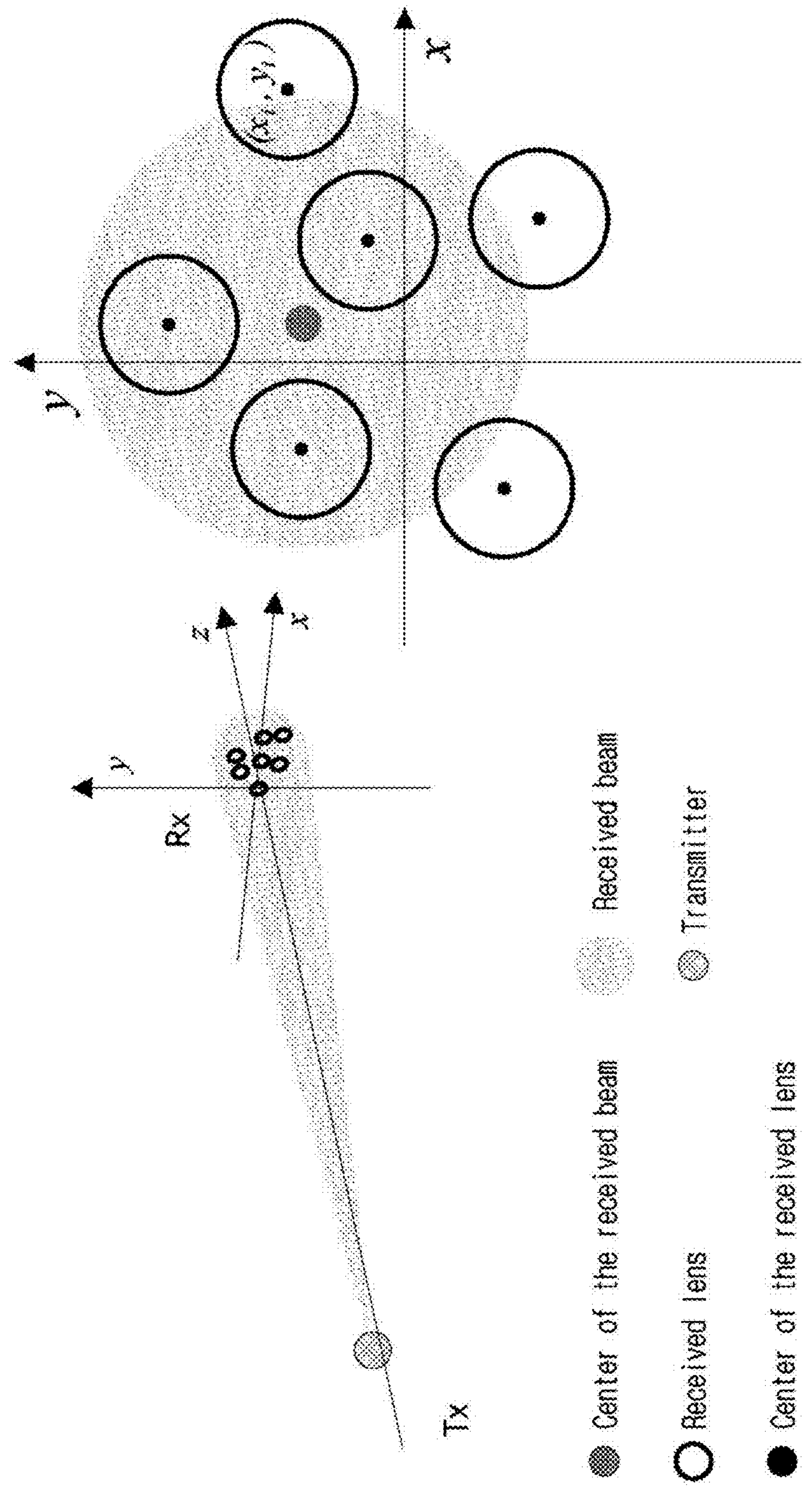
FIG. 2 is a diagram for describing a transmission and reception environment between a single transmission terminal and a multi-reception terminal in a wireless optical communication system to which the present disclosure may be applied.

FIG. 2 is a diagram for describing a transmission and reception environment between a single transmission terminal and a multi-reception terminal in a wireless optical communication system to which the present disclosure may be applied.

As in FIG. 2, a signal-to-noise ratio (SNR) when a diversity technique is used in a Single Input Multiple Output (SIMO) situation consisting of one transmission terminal and N reception terminals is expressed as $\gamma_{div}$, and $\gamma_{div}$ may be defined as in Equation 10.

$$\gamma_{div} = \frac{\left|\sum_{i=1}^{N} h_l h_{a,i} h_{p,i} P_t\right|^2}{No/2} \quad \text{[Equation 10]}$$

In Equation 10, $P_t$ refers to transmission power in a transmission terminal, and $N_0$ represents a noise distribution in a reception terminal.

In Equation 10, it is assumed that a distances between a transmission lens and a i-th (or i-th) reception lens are all the same. Accordingly, power attenuation according to a distance between one transmission lens and each of a plurality of reception lenses may be equally expressed as $h_1$. In addition, $h_{a,i}$ represents power attenuation according to a medium characteristic between one transmission lens and a i-th reception lens (e.g., atmospheric turbulence). In addition, $h_p(r_{dis},z)$ may correspond to power of a beam received at a reception lens when a distance between the center of a reception beam and the center of a reception lens is defined as $r_{dis}=(x_t, y_t)$.

Accordingly, in Equation 10, $h_1 h_{a,i} h_{p,i}$ may refer to power of light of a part where a i-th reception lens overlaps with a transmission beam (i.e., power of a reception beam in a i-th reception terminal) when a transmission terminal transmits a beam in a direction centered on a coordinate $(x_t, y_t)$ as in FIG. 2.

Here, $h_{p,i}$ may be expressed as in Equations 11 and 12 below based on Equations 8 and 9.

$$h_{p,i}(r_{dis}, z) = \int_{-r_a}^{r_a}\int_{-\sqrt{r_a^2-y^2}}^{\sqrt{r_a^2-y^2}} \frac{2}{\pi w_z}\exp\left(-\frac{2((x_t-x_i)^2+(y_t-y_i)^2)}{w_z^2}\right)dxdy \quad \text{[Equation 11]}$$

$$h_{p,i}(r_{dis}, z) \simeq A_0\exp\left(-\frac{2((x_t-x_i)^2+(y_t-y_i)^2)}{w_{zeq}^2}\right) \quad \text{[Equation 12]}$$

In Equations 11 and 12, $x_i$ and $y_i$ correspond to a center coordinate of a i-th reception lens. In Equation 10, $h_1$ and $P_t$ are a constant, and if a form of Equation 12 is utilized, Equation 10 may be expressed as in Equation 13.

$$\gamma_{div} = \frac{\left|h_l P_t \sum_{i=1}^{N} m_i A_0\exp\left(-\frac{2((x_t-x_i)^2+(y_t-y_i)^2)}{w_{zeq}^2}\right)\right|^2}{No/2} \quad \text{[Equation 13]}$$

In Equation 13, $m_i$ is a constant corresponding to $h_{a,i}$ in Equation 10 (i.e., power attenuation according to a medium characteristic between one transmission lens and a i-th reception lens (e.g., atmospheric turbulence)).

Based on an equation for a SNR considering diversity in Equation 13, (x,y), a center coordinate of a reception beam that maximizes a SNR, may be expressed as follows.

$$(x^*, y^*) = \mathrm{argmax}_{(x,y)}\frac{\left|h_l P_t \sum_{i=1}^{N} m_i A_0\exp\left(-\frac{2((x-x_i)^2+(y-y_i)^2)}{w_{zeq}^2}\right)\right|^2}{No/2} \quad \text{[Equation 14]}$$

$$x^* = \mathrm{argmax}_x\frac{\left|h_l P_t \sum_{i=1}^{N} m_i A_0\exp\left(-\frac{2((x-x_i)^2+(y^*-y_i)^2)}{w_{zeq}^2}\right)\right|^2}{No/2} \quad \text{[Equation 15]}$$

$$y^* = \mathrm{argmax}_y\frac{\left|h_l P_t \sum_{i=1}^{N} m_i A_0\exp\left(-\frac{2((x^*-x_i)^2+(y-y_i)^2)}{w_{zeq}^2}\right)\right|^2}{No/2} \quad \text{[Equation 16]}$$

In order to find a (x,y) pair that maximizes x* in Equation 15 and y* in Equation 16, a (x,y) value that differentiates a right side of each equation to make it 0 may be obtained. An equation obtained by differentiating Equations 15 and 16 may be briefly expressed as follows.

$$(x^* - x_1) + \sum_{i=2}^{N} p_{i,x} q_{i,x} \exp(q_{i,x}) = 0 \quad \text{[Equation 17]}$$

$$(y^* - y_1) + \sum_{i=2}^{N} p_{i,y} q_{i,y} \exp(q_{i,y}) = 0 \quad \text{[Equation 18]}$$

In Equations 17 and 18, each variable may be defined as follows.

$$p_{i,x} = \frac{c_{i,x}\exp\left(d\left(x_i^2 - x_1^2\right)\right)}{2d(x_1 - x_i)}\exp(2d(x_1 - x_i)x_i) \quad \text{[Equation 19]}$$

$$p_{i,y} = \frac{c_{i,y}\exp\left(d\left(y_i^2 - y_1^2\right)\right)}{2d(y_1 - y_i)}\exp(2d(y_1 - y_i)y_i) \quad \text{[Equation 20]}$$

$$q_{i,x} = 2d(x_1 - x_i)(x^* - x_i) \quad \text{[Equation 21]}$$

$$q_{i,y} = 2d(y_1 - y_i)(y^* - y_i) \quad \text{[Equation 22]}$$

$$c_{i,x} = \frac{m_i}{m_1}\exp\left(d\left(2(y_1 - y_i)y^* - \left(y_1^2 - y_i^2\right)\right)\right) \quad \text{[Equation 23]}$$

$$c_{i,y} = \frac{m_i}{m_1}\exp\left(d\left(2(x_1 - x_i)x^* - \left(x_1^2 - x_i^2\right)\right)\right) \quad \text{[Equation 24]}$$

$$d = -\frac{2}{w_{zeq}^2} \quad \text{[Equation 25]}$$

As a result, if a value of x and y is obtained based on Equations 17 and 18, a beam direction that maximizes a SNR may be determined in an environment where reception lenses are randomly arranged as in FIG. 2.

A solution in Equations 17 and 18 may be calculated by using a Newton's method. Referring to Equations 21 to 24, it may be seen that a value of y* is needed to find x*, and a value of x* is needed to find y*. Accordingly, after fixing any one of x* or y* and finding one remaining value, a process of finding another value is iterated by using a found value, and if a specific convergence error is satisfied, an optimal value may be considered derived to terminate iteration. For example, after fixing a value of y* to 0 to find a value of x* first, a corresponding value of x* is used to find a value of y*, and an obtained value of y* is used to find a value of x*, which may be performed repetitively until convergence. Alternatively, after fixing a value of x* to 0 to find a value of y* first, a corresponding value of y* is used to find a value of x*, and an obtained value of x* is used to find a value of y*, which may be performed repetitively until convergence.

As described above, a method for deriving an optimal beam direction from a single transmission terminal to at least one or a plurality of reception terminals may be applied to an example below.

As an example, a gamma-gamma channel model which is typically adopted when analyzing the performance of wireless optical communication was applied, and simulation was conducted when white Gaussian noise exists. First, $f_h(h)$, a probability density function for channel h of a gamma-gamma channel model is expressed as follows.

$$f_{h_a}(h_a) = \frac{2(\alpha\beta)^{\frac{\alpha+\beta}{2}}}{\Gamma(\alpha)\Gamma(\beta)} h_a^{\frac{\alpha+\beta}{2}-1} K_{\alpha-\beta}\left(2\sqrt{\alpha\beta h_a}\right) \quad \text{[Equation 26]}$$

In Equation 26, $\Gamma(\ )$ refers to a Gamma-function, $K_v(\ )$ refers to a second type modified Bessel function, and $\alpha$ and $\beta$ may be defined as follows.

$$\alpha = \left[\exp\left(\frac{0.49\sigma_R^2}{\left(1 + 1.11\sigma_R^{12/5}\right)^{7/6}}\right) - 1\right]^{-1} \quad \text{[Equation 27]}$$

$$\beta = \left[\exp\left(\frac{0.51\sigma_R^2}{\left(1 + 0.69\sigma_R^{12/5}\right)^{5/6}}\right) - 1\right]^{-1} \quad \text{[Equation 28]}$$

In Equations 27 and 28, $\sigma^2_{R-}$ refers to turbulence intensity with Rytov variance, which may be expressed as in $$\sigma_R^2 = 1.23k^{7/6}C_n^2 z^{11/6}.$$

A gamma-gamma channel model is satisfied for $\sigma^2_{R-}>=0.3$.

In addition, Gaussian noise n has a Gaussian distribution with an average of 0 and a variance of $N_0/2$. Specific variable setting values are shown in Table 1.

TABLE 1

| Parameter | Symbol | Value |
|---|---|---|
| Attenuation coefficient | $\sigma$ | 0.00110622 |
| Distance between transmission terminal and reception terminal | z | 1000 [m] |
| Noise variance | No | −174 [dBm/Hz] |
| Number of reception terminals | N | 5 [EA] |
| Used frequency | f | 1550 [nm] |
| Rytov variance (Turbulence intensity) | $\sigma^2_R$ | 6 |
| Beam size at z = 0 | $\omega_0$ | 0.0254 [m] |
| Reception terminal lens radius | $r_a$ | 0.04 [m] |
| Bandwidth | BW | 20 [GHz] |
| Transmit power | $P_t$ | 20, 22, . . . , 48, 50 |
| Convergence error | e | $10^{-3}$ |

Figure 3:
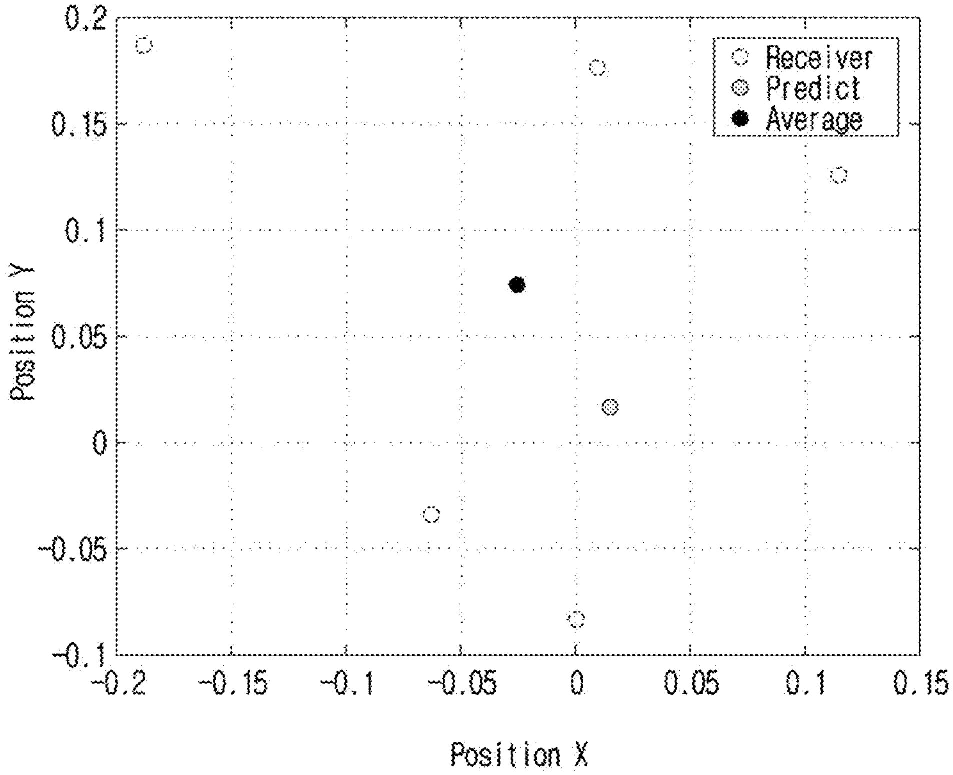
FIG. 3 is a diagram showing a transmission beam direction according to the present disclosure.

FIG. 3 is a diagram showing a transmission beam direction according to the present disclosure.

For N arbitrary reception terminal coordinates, a coordinate predicted through examples of the present disclosure, an average coordinate of N reception terminals and a transmission rate [bps/Hz] when a beam is transmitted to the center of each reception lens were compared and analyzed.

When an arbitrary reception terminal coordinate is given in FIG. 3, an average point between an optimal position of a beam predicted through examples of the present disclosure and a reception terminal coordinate may be confirmed. Examples of the present disclosure may differ slightly from an average point because the technology determines a beam in a direction that maximizes a SNR by using a channel environment.

Figure 4:
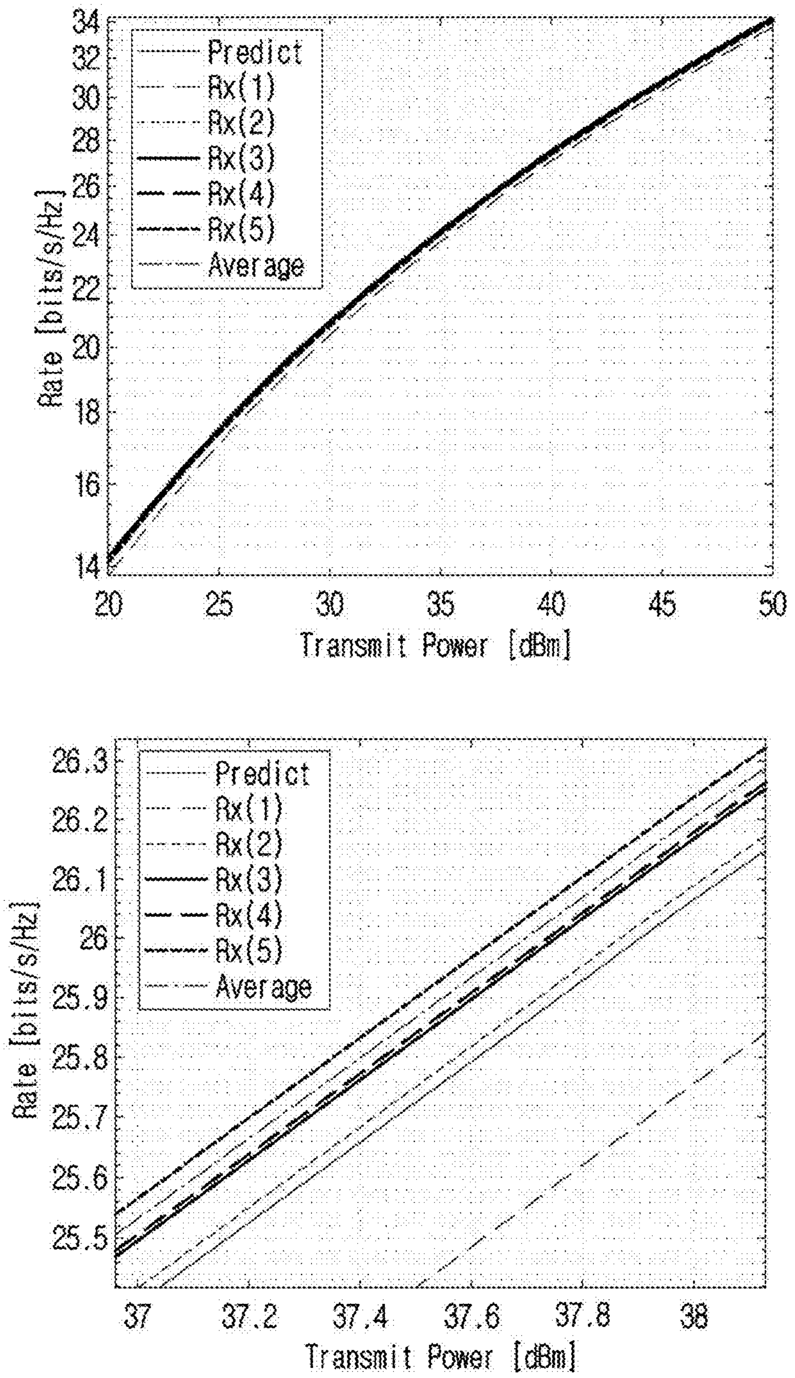
FIG. 4 is a diagram showing a transmission rate value according to a transmission power value according to the present disclosure.

FIG. 4 is a diagram showing a transmission rate value according to a transmission power value according to the present disclosure.

In FIG. 4, a transmission rate value obtained when transmitting a beam to a coordinate predicted through examples of the present disclosure, an average coordinate and a center coordinate of each reception terminal lens may be confirmed in a graph. A transmission rate may be obtained as follows.

$$C = \log_2(1 + \gamma_{div}) \quad \text{[Equation 29]}$$

In this way, it may be seen that excellent performance is obtained when beam-pointing is performed toward a coordinate obtained through examples of the present disclosure.

Figure 5:
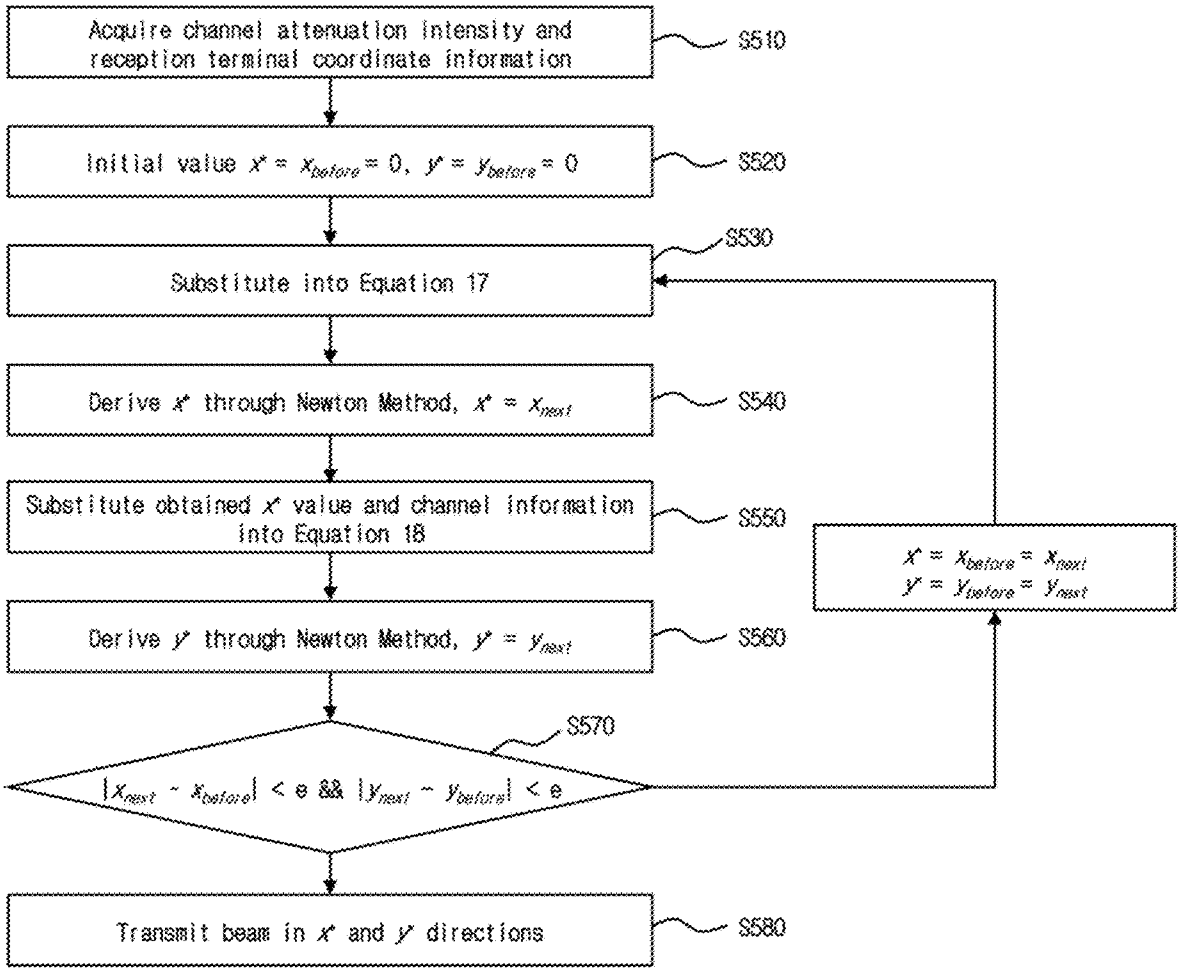
FIG. 5 is a flowchart for describing a method for optimizing beam-pointing according to the present disclosure.

FIG. 5 is a flowchart for describing a method for optimizing beam-pointing according to the present disclosure.

In S510, an optical transmission device may acquire channel attenuation intensity and reception terminal coordinate information based on feedback information from an optical reception device.

In S520, an optical transmission device may configure an initial value as 0 to obtain an optimized solution for a center coordinate (x,y) toward which a transmission beam is directed.

In S530, an optical transmission device may substitute an initial value into Equation 17, derive x* through a Newton's method in S540, and update it to a value of x ($x_{next}$) for next repetition.

In S550, a value of x* and channel information obtained in a previous step may be substituted into Equation 18, and in S560, y* may be derived through a Newton's method and updated to a value of y ($y_{next}$) for next repetition.

In S570, for each of x* and y*, whether a difference between a previous values of corresponding iteration ($x_{before}$ and $y_{before}$) and a next value updated in corresponding iteration ($x_{next}$ and $y_{next}$) is less than a predetermined convergence error (e) may be determined.

If it is equal to or greater than a convergence error, in S590, a next value updated in corresponding iteration ($x_{next}$ and $y_{next}$) may be updated to be the same as a previous value of x and y ($x_{before}$ and $y_{before}$), and next iteration may start from S530.

If it is less than a convergence error, it may be determined in S580 that a value of x*, y* updated in corresponding iteration is an optimal beam direction, which may be applied as x,y, a center coordinate of a transmission beam, (i.e., by optimizing beam-pointing) to transmit a beam.

Figure 6:
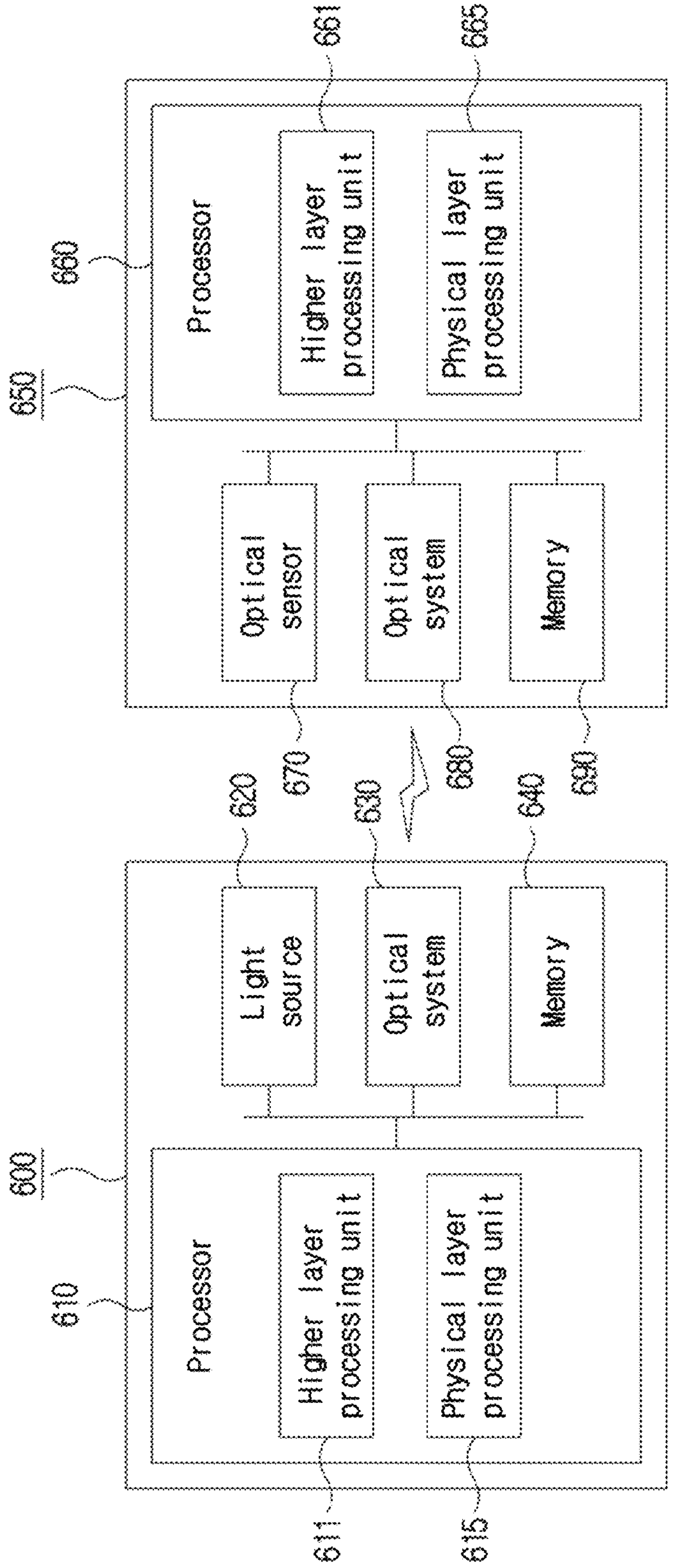
FIG. 6 is a diagram showing a configuration of a transmission device and a reception device according to the present disclosure.

FIG. 6 is a diagram showing a configuration of a transmission device and a reception device according to the present disclosure.

A transmission device 600 may include a processor 610, a light source 620, an optical system 630 and a memory 640.

A processor 610 performs optical communication-related signal processing, and may include a higher layer processing unit 611 and a physical layer processing unit 615. A higher layer processing unit 611 may process an operation such as modulation, etc. for an optical signal to be transmitted. A physical layer processing unit 615 may process an operation which controls a light source-driven driver, an optical system, etc. in order to generate and transmit an optical signal. In addition to performing optical communication-related signal processing, a processor 610 may also control the overall operation of a transmission device 600.

An optical system 630 may include at least one lens, and may support MIMO transmission or reception when it includes a plurality of lenses. A memory 640 may store information processed by a processor 610, software related to an operation of a transmission device 600, an operating system, an application, etc., and may also include a component such as a buffer, etc.

A processor 610 of a transmission device 600 may be configured to implement an operation of an optical transmission device in embodiments described in the present disclosure.

A reception device 650 may include a processor 660, an optical sensor 670, an optical system 680 and a memory 690.

A processor 660 performs optical communication-related signal processing, and may include a higher layer processing unit 661 and a physical layer processing unit 665. A higher layer processing unit 661 may process an operation such as demodulation, etc. on a received optical signal. A physical layer processing unit 665 may process an operation that controls an optical system, an optical sensor, etc. in order to receive and detect an optical signal. In addition to performing optical communication-related signal processing, a processor 660 may also control the overall operation of a reception device 650.

An optical system 680 may include at least one lens, and may support MIMO transmission or reception when it includes a plurality of lenses. A memory 690 may store information processed by a processor 660, software related to an operation of a reception device 650, an operating system, an application, etc., and may also include a component such as a buffer, etc.

A processor 660 of a reception device 650 may be configured to implement an operation of an optical reception device in embodiments described in the present disclosure.

In an operation of a transmission device 600 and a reception device 650, a description of an optical transmission device (transmission terminal) and an optical reception device (reception terminal) in examples of the present disclosure may be applied in the same way, and an overlapping description is omitted.

Figure 7:
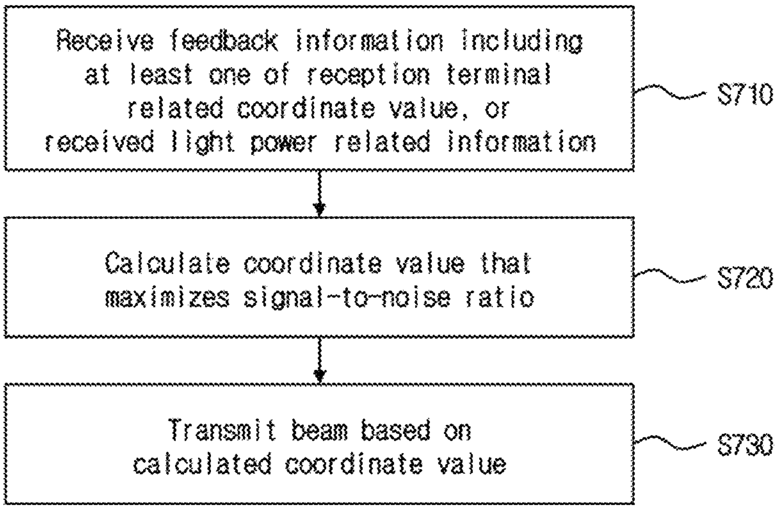
FIG. 7 is a diagram for describing a method for optimizing beam-pointing in a wireless optical communication system according to the present disclosure.

FIG. 7 is a diagram for describing a method for optimizing beam-pointing in a wireless optical communication system according to the present disclosure.

In S710, an optical transmission device may receive feedback information from an optical reception device. An optical transmission device may include at least one transmission terminal (e.g., at least one transmission lens), and an optical reception device may include at least one reception terminal (e.g., at least one reception lens).

Feedback information may include at least one of a coordinate value related to a reception terminal or information related to received light power.

Information about a coordinate value related to a reception terminal may include ($x_i$,$y_i$). Here, $x_i$ and $y_i$ correspond to a center coordinate of a i-th reception terminal. Since details thereof are the same as described in Equation 11 and below, an overlapping description is omitted.

Information related to received light power may include mi. Here, $m_i$ may have a value corresponding to power attenuation according to a medium characteristic between one transmission terminal and a i-th reception terminal. Since details thereof are the same as described in Equation 13 and below, an overlapping description is omitted.

In S720, an optical transmission device may calculate a coordinate value that maximizes a signal-to-noise ratio.

A calculated coordinate value may correspond to an optimal value of x*,y* (or a last updated value). Since details thereof are the same as described in Equation 14 and below, an overlapping description is omitted.

In S730, an optical transmission device may transmit a beam toward at least one reception terminal from a specific transmission terminal among at least one transmission terminal toward an optical reception device based on a calculated optimal value. x,y, a center coordinate of a transmission beam, may be configured (i.e., beam-pointed) as an optimal value of x*,y* calculated in S720. Accordingly, beam transmission that maximizes system performance may be performed even when the number of transmission terminals is not the same as the number of reception terminals.

For example, in order to point (the center of) a transmission beam from one transmission terminal (or lens) toward a specific coordinate, a gimbal-based Advanced Targeting Pod (ATP) method may be applied. For example, a two-axis or three-axis operation may be performed and a panning and tilting operation may be performed by using a mechanical rotary gimbal controlled by a motor. In addition, since an angular range of an operation is wide, it may be applied to ground-to-satellite or satellite-to-satellite FSO communication. A high-speed steering mirror (FSM) may be used to provide angle adjustment according to pointing resolution.

Illustrative methods of the present disclosure are expressed as motion series for clarity of a description, but it is not to limit an order that a step is performed and if necessary, each step may be performed simultaneously or in a different order. To implement a method according to the present disclosure, other step may be additionally included in an illustrated step, or remaining steps except for some steps may be included, or an additional other step except for some steps may be included.

A variety of embodiments of the present disclosure do not enumerate all possible combinations, but are to describe a representative aspect of the present disclosure, and matters described in various embodiments may be independently applied or may be applied by at least two combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A scope of the present disclosure includes software or machine-executable commands (e.g., an operating system, an application, a firmware, a program, etc.) which execute an action according to a method of various embodiments in a device or a computer and a non-transitory computer-readable medium that such software or commands, etc. are stored and are executable in a device or a computer.

INDUSTRIAL APPLICABILITY

The present disclosure may be applied to a variety of wireless optical communication systems.

The invention claimed is:

1. A method for optimizing a beam-pointing in a wireless optical communication system, the method comprising:

receiving, from an optical reception device, by an optical transmission device, information related to power of a received light in at least one reception terminal based on a coordinate value associated with the at least one reception terminal of the optical reception device from a specific transmission terminal among at least one transmission terminal of the optical transmission device, determining, by the optical transmission device, a coordinate value which maximizes a signal-to-noise ratio based on the information related to the power of the received light; and transmitting, toward the optical reception device, a beam from the specific transmission terminal of the optical transmission device based on the determined coordinate value, wherein the coordinate value associated with the at least one reception terminal includes ($x_i$, $y_i$) that corresponds to a center coordinate of a i-th reception terminal, and wherein the information related to the power of the received light in the at least one reception terminal includes a value of mi corresponding to a power attenuation according to a medium characteristic between the specific transmission terminal and the i-th reception terminal.

2. The method of claim 1, wherein the determining the coordinate value includes:

configuring an initial value of (x, y), a center coordinate toward which the beam heads, as 0;

performing an iteration of a process of fixing x*, an updated value for x, and finding an optimal value of y*, an updated value for y, or fixing the y* and finding the x*; and if the x* and the y* satisfy a predetermined reference value for a convergence error, terminating the iteration, and determining x* and y* updated when the iteration terminates as the coordinate value.

3. The method of claim 2, wherein:

the convergence error corresponds to each difference between a value of x and y* before a specific iteration and a value of x* and y* updated in the specific iteration.

4. The method of claim 3, wherein:

a value of the x* is calculated based on an equation below, $$(x^* - x_1) + \sum_{i=2}^{N} p_{i,x} q_{i,x} \exp(q_{i,x}) = 0$$

wherein in the equation, $$p_{i,x} = \frac{c_{i,x} \exp\left(d\left(x_i^2 - x_1^2\right)\right)}{2d(x_1 - x_i)} \exp(2d(x_1 - x_i)x_i),$$

$$q_{i,x} = 2d(x_1 - x_i)(x^* - x_i),$$

$$c_{i,x} = \frac{m_i}{m_1} \exp\left(d\left(2(y_{1-} y_i)y^* - \left(y_1^2 - y_i^2\right)\right)\right).$$

5. The method of claim 4, wherein:

a value of the y* is calculated based on the equation below, $$(y^* - y_1) + \sum_{i=2}^{N} p_{i,y} q_{i,y} \exp(q_{i,y}) = 0$$

wherein in the equation, $$p_{i,y} = \frac{c_{i,y} \exp\left(d\left(y_i^2 - y_1^2\right)\right)}{2d(y_1 - y_i)} \exp(2d(y_1 - y_i)y_i),$$

$$q_{i,y} = 2d(y_1 - y_i)(y^* - y_i),$$

$$c_{i,y} = \frac{m_i}{m_1} \exp\left(d\left(2(x_{1-} x - i)x^* - \left(x_1^2 - x_i^2\right)\right)\right).$$

6. The method of claim 5, wherein:

$$d = -\frac{2}{w_{zeq}^2},$$

$$w_{zeq}^2 = w_z^2 \frac{\sqrt{\pi}\,\mathrm{erf}(v)}{2v\exp(-v^2)},$$

$$\mathrm{erf}(z) = \frac{2}{\sqrt{\pi}} \int_0^z e^{-x^2},$$

$$v = \frac{\sqrt{\pi}\, r_a}{\sqrt{2}\, w_z}.$$

7. The method of claim 6, wherein:

$$w_z = w_0\left(1 + \epsilon\left(\frac{\lambda z}{\pi w_0^2}\right)^2\right)^{1/2},$$

wherein, $w_0$ corresponds to a beam size in z=0, and λ corresponds to a wavelength of a beam, and $$\epsilon = \left(1 + \frac{2w_0^2}{\rho_o^2(z)}\right).$$

8. The method of claim 7, wherein:

$$\rho_o^2(z) = \left(0.55\ C_n^2 k^2 z\right)^{-3/5}$$

wherein, k corresponds to a number of light waves, and $C^2_n$ corresponds to a refractive structure parameter.

9. The method of claim 1, wherein:

each of the at least one transmission terminal corresponds to one transmission lens, each of the at least one reception terminal corresponds to one reception lens.

10. An optical transmission device for optimizing a beam-pointing in a wireless optical communication system, the device comprising:

a processor;

a light source;

an optical system; and a memory, wherein the processor is configured to:

receive, from an optical reception device, by the optical transmission device, information related to power of a received light in at least one reception terminal based on a coordinate value associated with the at least one reception terminal of the optical reception device from a specific transmission terminal among at least one transmission terminal of the optical transmission device;

determine, by the optical transmission device, a coordinate value which maximizes a signal-to-noise ratio based on the information related to the power of the received light; and transmit, toward the optical reception device, a beam from the specific transmission terminal of the optical transmission device based on the determined coordinate value, wherein the coordinate value associated with the at least one reception terminal includes $(x_i, y_i)$ that corresponds to a center coordinate of a i-th reception terminal, and wherein the information related to the power of the received light in the at least one reception terminal includes a value of mi corresponding to a power attenuation according to a medium characteristic between the specific transmission terminal and the i-th reception terminal.

* * * * *